United States Patent [19]
Gremban

[11] Patent Number: 5,877,896
[45] Date of Patent: Mar. 2, 1999

[54] COMPUTER SCREEN PRIVACY AND LIGHT SHADE ACCESSORY

[75] Inventor: Ronald Dean Gremban, Corte Madera, Calif.

[73] Assignee: Forsites Software Development Corporation, Corte Madera, Calif.

[21] Appl. No.: 789,997

[22] Filed: Jan. 28, 1997

[51] Int. Cl.[6] .......................... G02B 27/00; G02B 21/00; H04N 5/64
[52] U.S. Cl. .......................... 359/601; 359/610; 348/842
[58] Field of Search ..................... 359/601, 610, 359/611, 612, 613; 348/834, 842; 248/346.3, 346.5

[56] References Cited

U.S. PATENT DOCUMENTS

| 3,564,138 | 2/1971 | Harrold | 348/842 |
| 4,314,280 | 2/1982 | Rose | 348/842 |
| 4,784,468 | 11/1988 | Tierney | 359/601 |
| 5,101,298 | 3/1992 | Lentz et al. | 359/612 |
| 5,218,474 | 6/1993 | Kirschner | 359/601 |
| 5,325,970 | 7/1994 | Dillon et al. | 206/576 |
| 5,717,566 | 2/1998 | Tao | 361/681 |

*Primary Examiner*—Cassandra C. Spyrou
*Assistant Examiner*—Mark A. Robinson

[57] ABSTRACT

A privacy and light shade accessory for the screen member of a laptop computer in its viewing position having a base member directly or indirectly mountable on the laptop computer provided with pivotal shade panels movable between a folded storage position and an unfolded operative screen shielding position. In two embodiments of the invention, the shade panels are pivotally attached directly to a base member comprising a cover of a laptop computer carrying case. In a third embodiment, the base member and shade panels are releasably attached to an outer rear surface of the screen member of the computer.

20 Claims, 18 Drawing Sheets

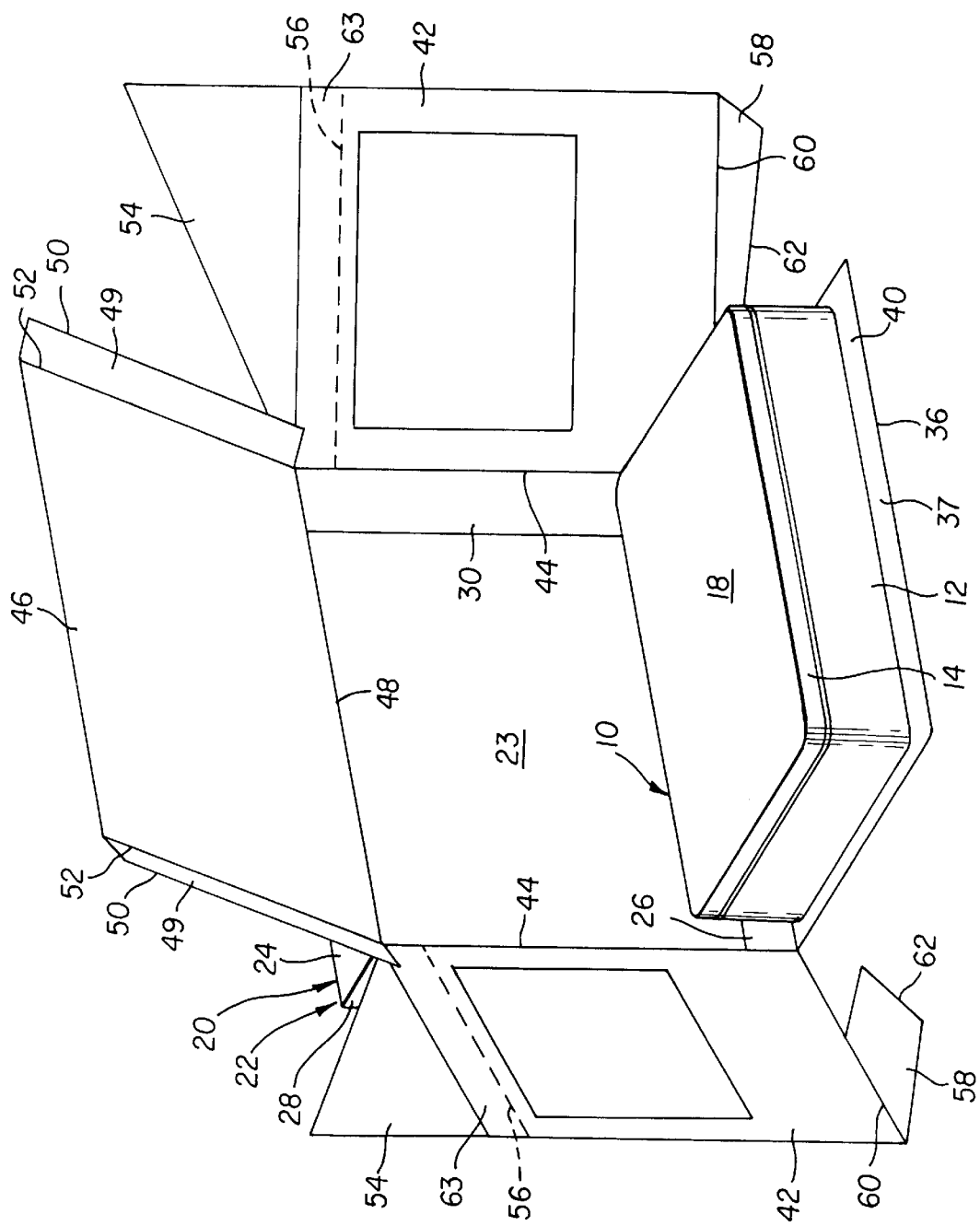
FIG. IA

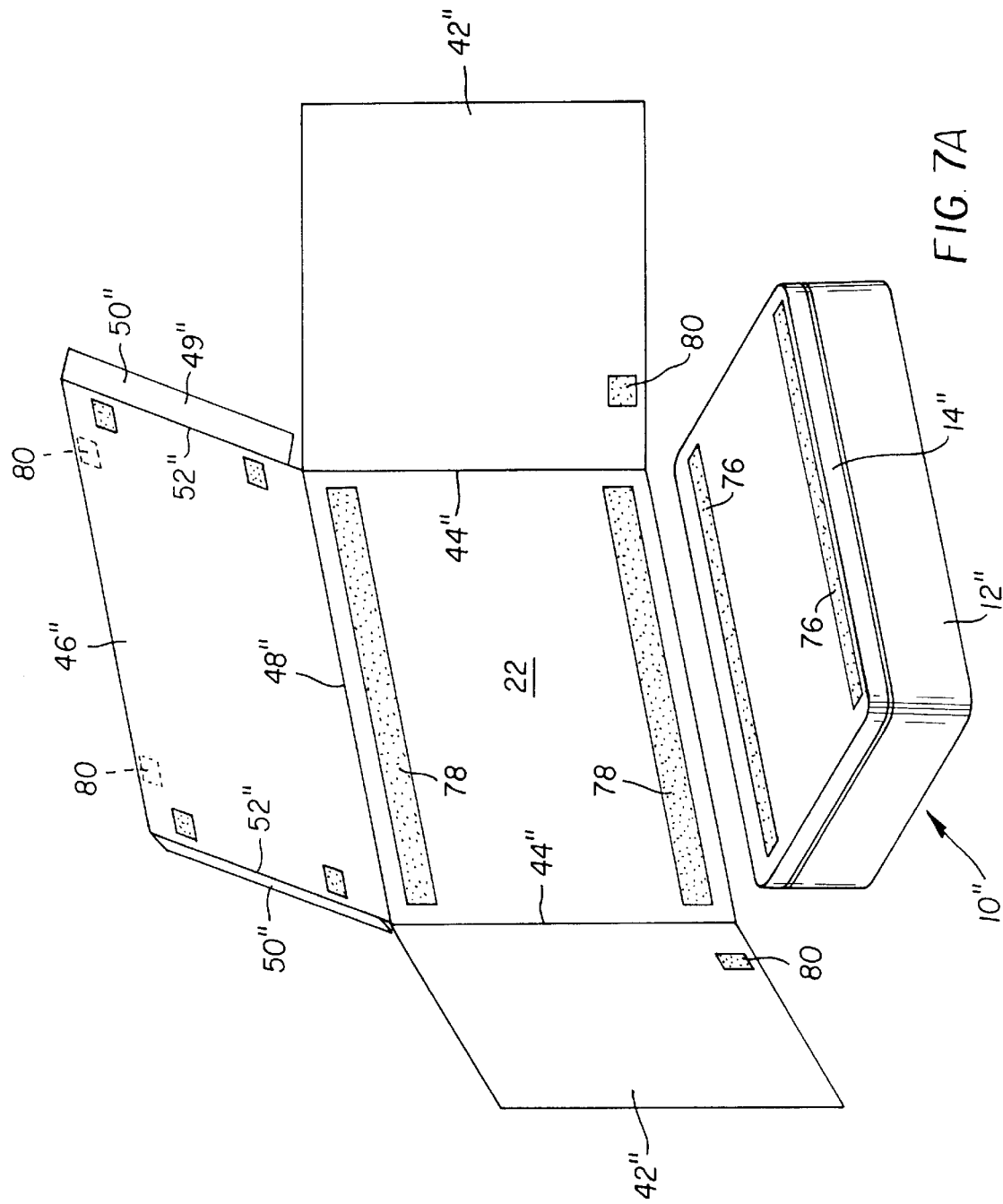

COMPUTER SCREEN PRIVACY AND LIGHT SHADE ACCESSORY

BACKGROUND OF THE INVENTION

1. Field of the Invention

This invention relates generally to computer accessories, and more specifically to a privacy and light shade accessory to provide privacy and shade for the screen of a laptop, notebook, or subnotebook computer (herein referred to collectively as a laptop computer) in its viewing position.

2. Description of the Prior Art

The inventor is unaware of any accessory devices for a laptop computer for providing privacy and/or shade for the screen when it is in its viewing position.

SUMMARY OF THE INVENTION

In accordance with preferred embodiments of the invention, a base member is mountable directly or indirectly on a laptop computer. A plurality of shade panels are hingeably secured to the base member for movement between a folded storage position in which the shade panels overlap each other and the base member for compact storage and portability, and an unfolded operative position in which the shade panels cooperate to provide the viewing screen with privacy and shade.

It is accordingly one of the objects of the invention to provide a privacy and light shade accessory for a laptop computer that will enable the user to use the computer in a public place or in a highly illuminated environment such as outdoor sunlight with the viewing screen maintained in privacy and shaded from the light.

The invention and its objects and advantages will become more apparent from the detailed description of the preferred embodiments presented below.

BRIEF DESCRIPTION OF THE DRAWINGS

In the detailed description of the preferred embodiments of the invention presented below, reference is made to the accompanying drawings, in which:

FIGS. 1 and 1A are perspective vector and 3D solid renderings or views respectively of the same drawing, of one embodiment of a privacy and light shade accessory of this invention in a partially open position;

FIGS. 7 and 7A are perspective vector and 3D solid renderings or views respectively of the same drawing view of still another embodiment of a privacy and light shade accessory of this invention in a partially open position;

DESCRIPTION OF THE PREFERRED EMBODIMENTS

Figure 1:
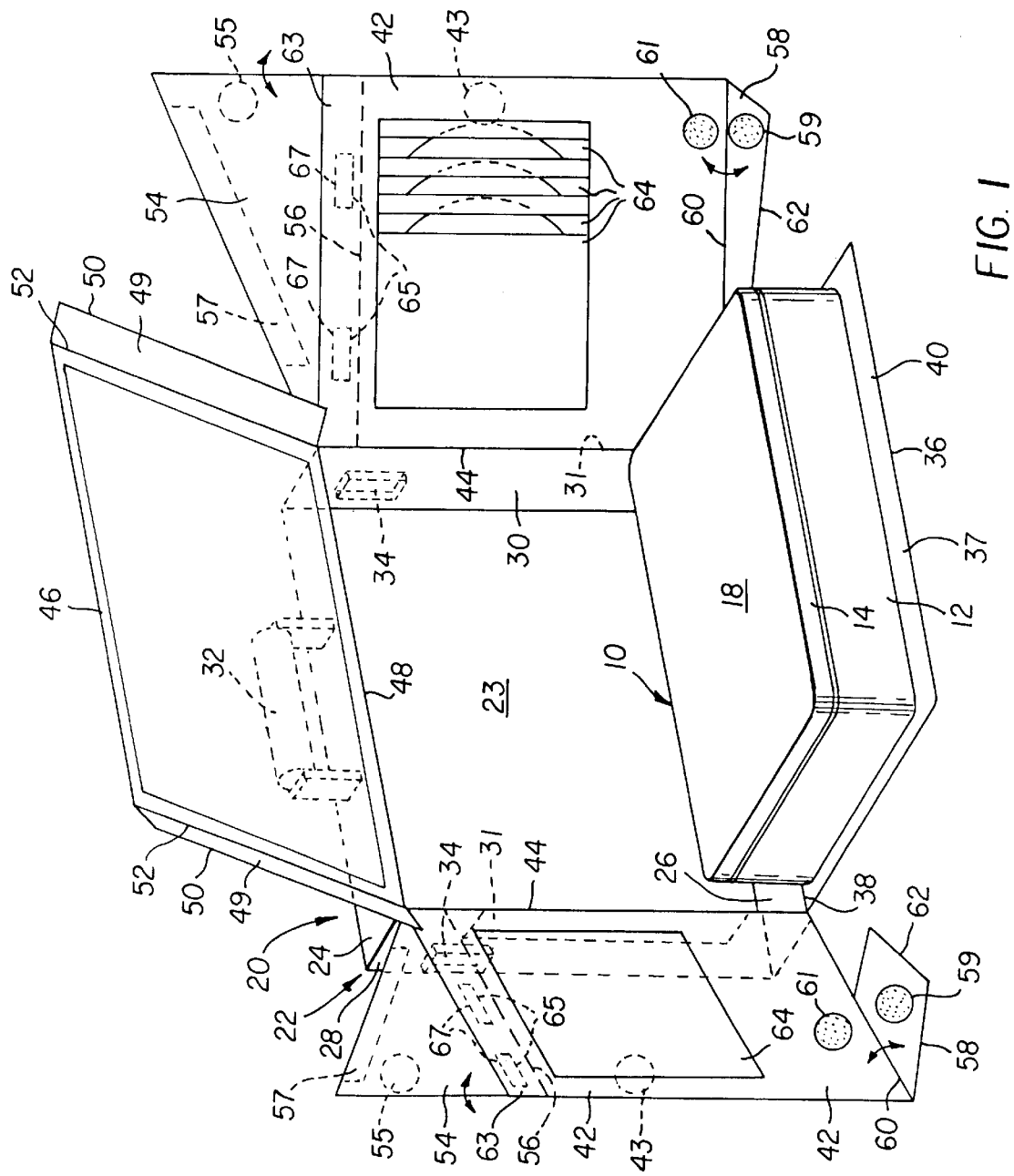

With reference to FIG. 1, a conventional laptop computer 10 is disclosed having a lower keyboard member 12 and an upper screen member 14 pivotally mounted to the keyboard member. The upper screen member 14 has a finite thickness with a viewing screen 16 on its inner side as best seen in FIG. 2, and a substantially flat outer surface 18.

Figure 2:
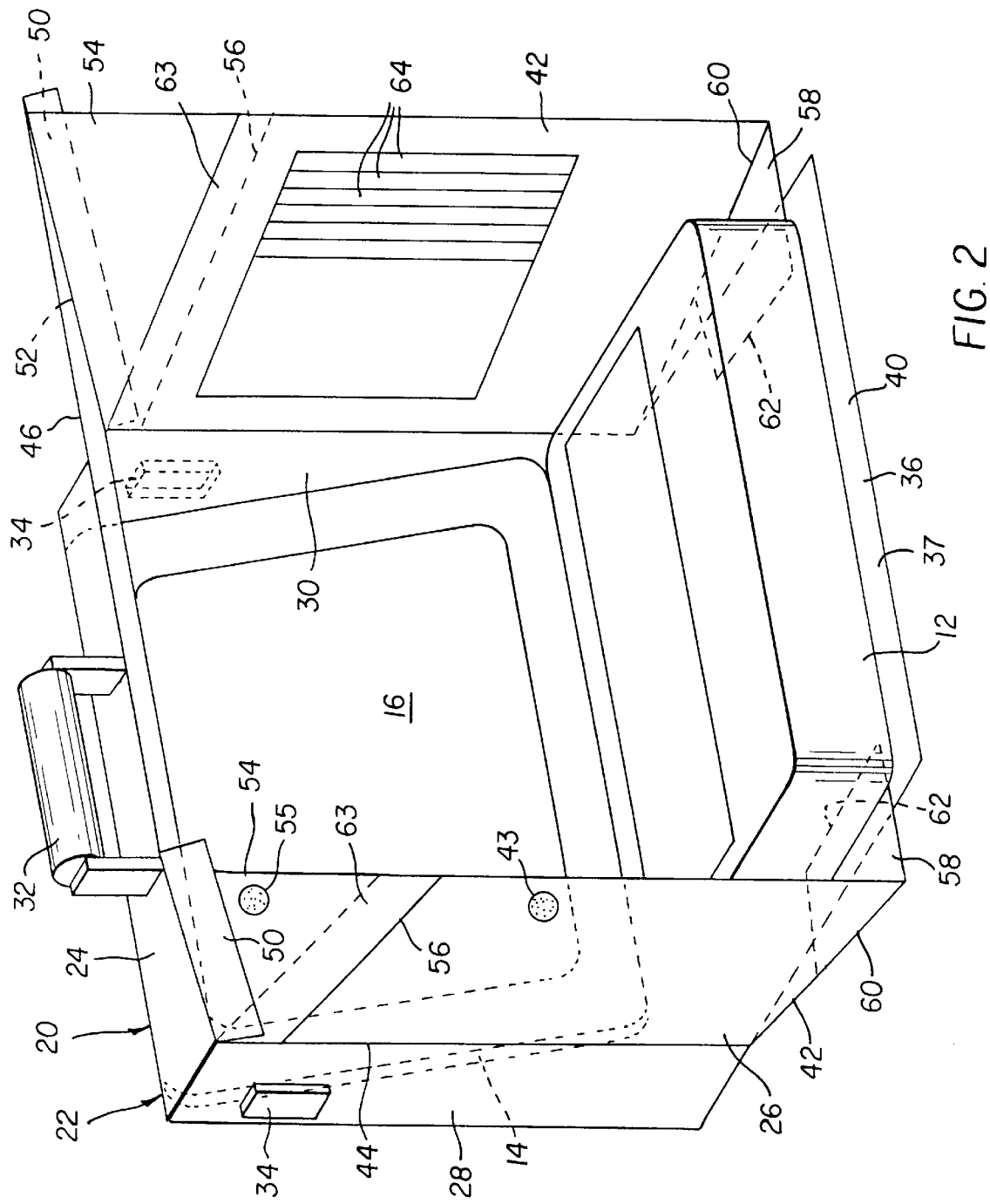
FIGS. 2 and 2A are perspective views similar to FIGS. 1 and 1A showing the privacy and light shade accessory in its operative position to provide the computer screen with privacy and shade.
Figure 2A:
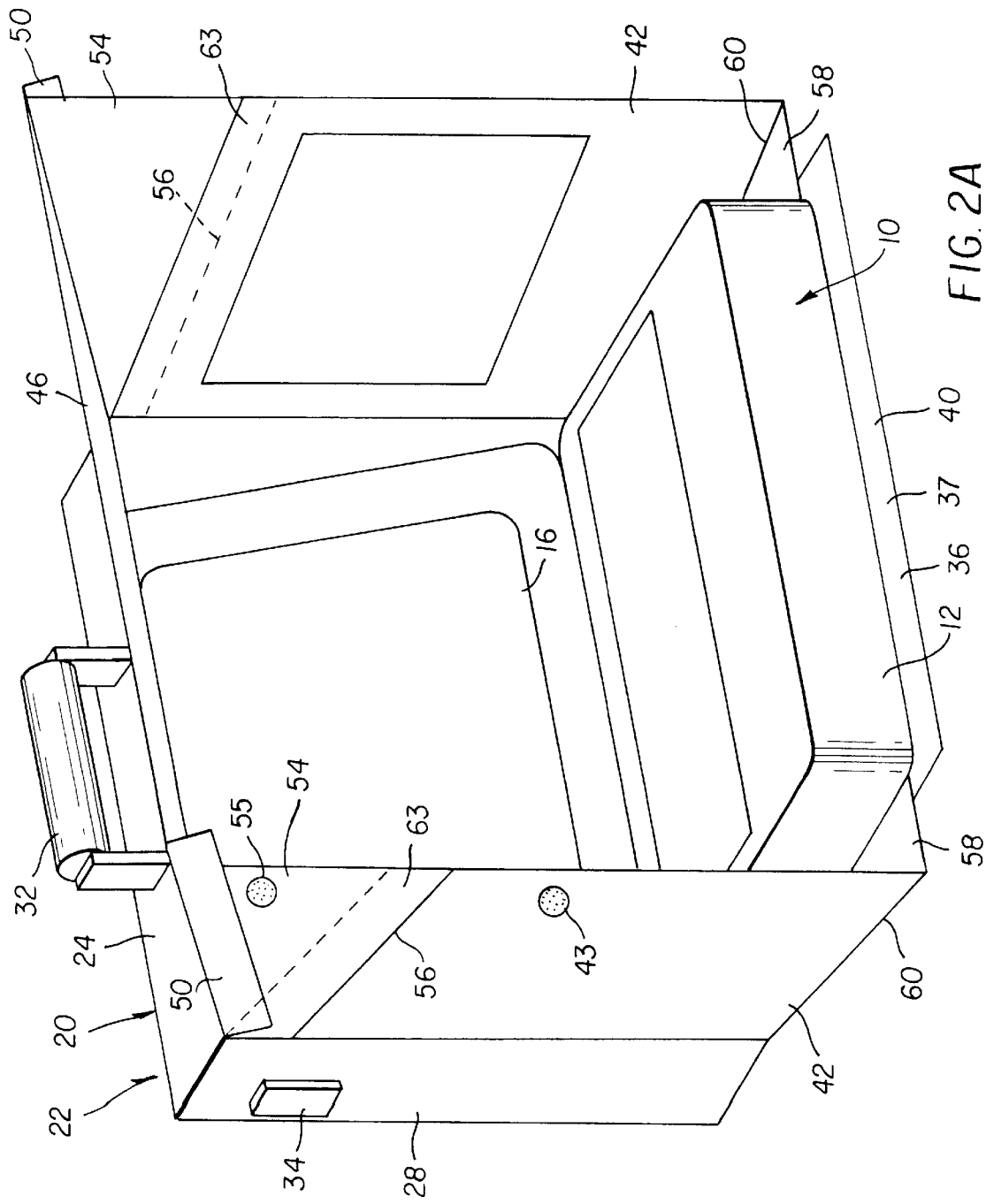
Figure 3:
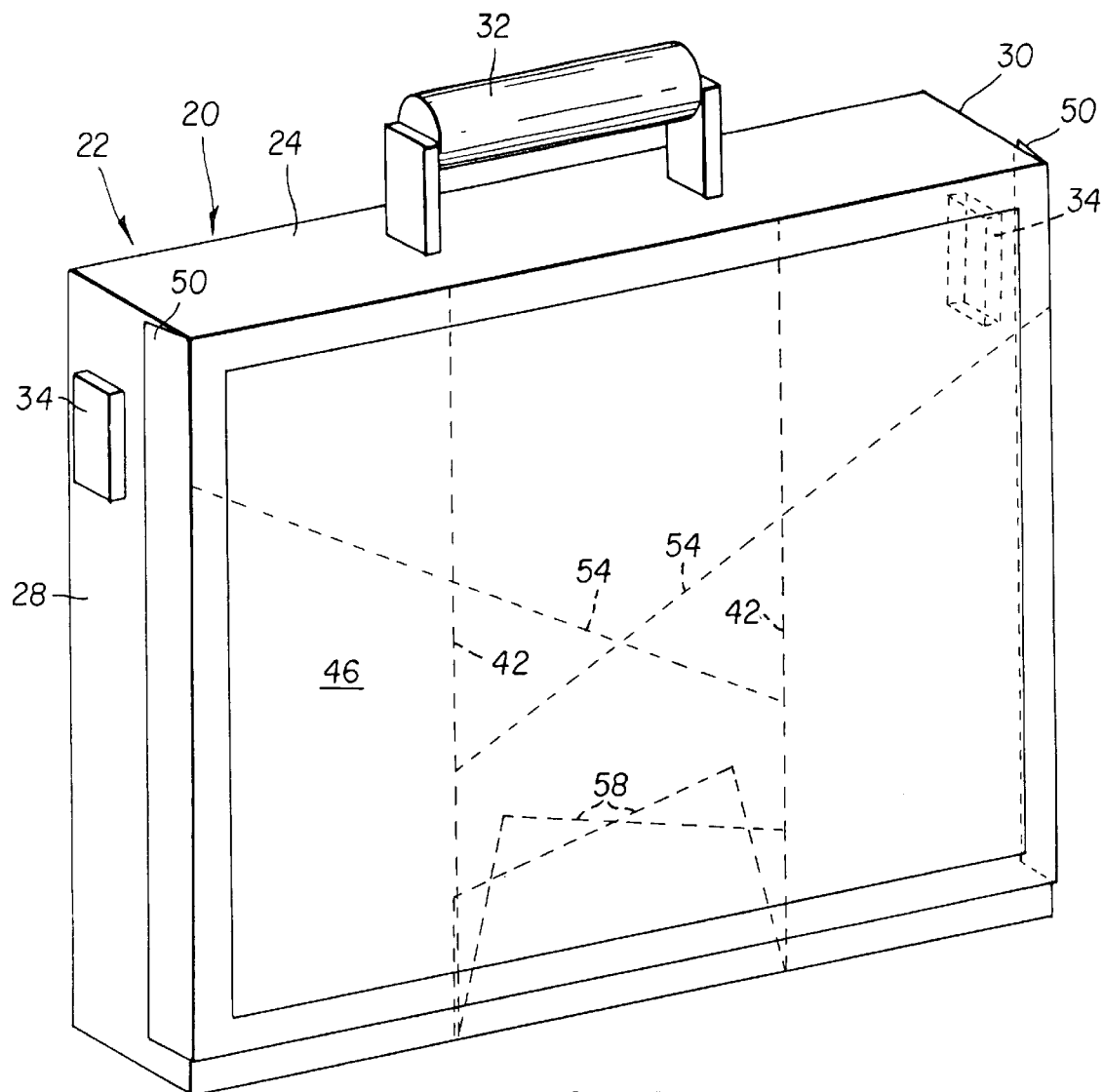
FIGS. 3 and 3A are perspective views similar to FIGS. 1 and 1A showing the privacy and light shade accessory in its closed storage position.
Figure 3A:
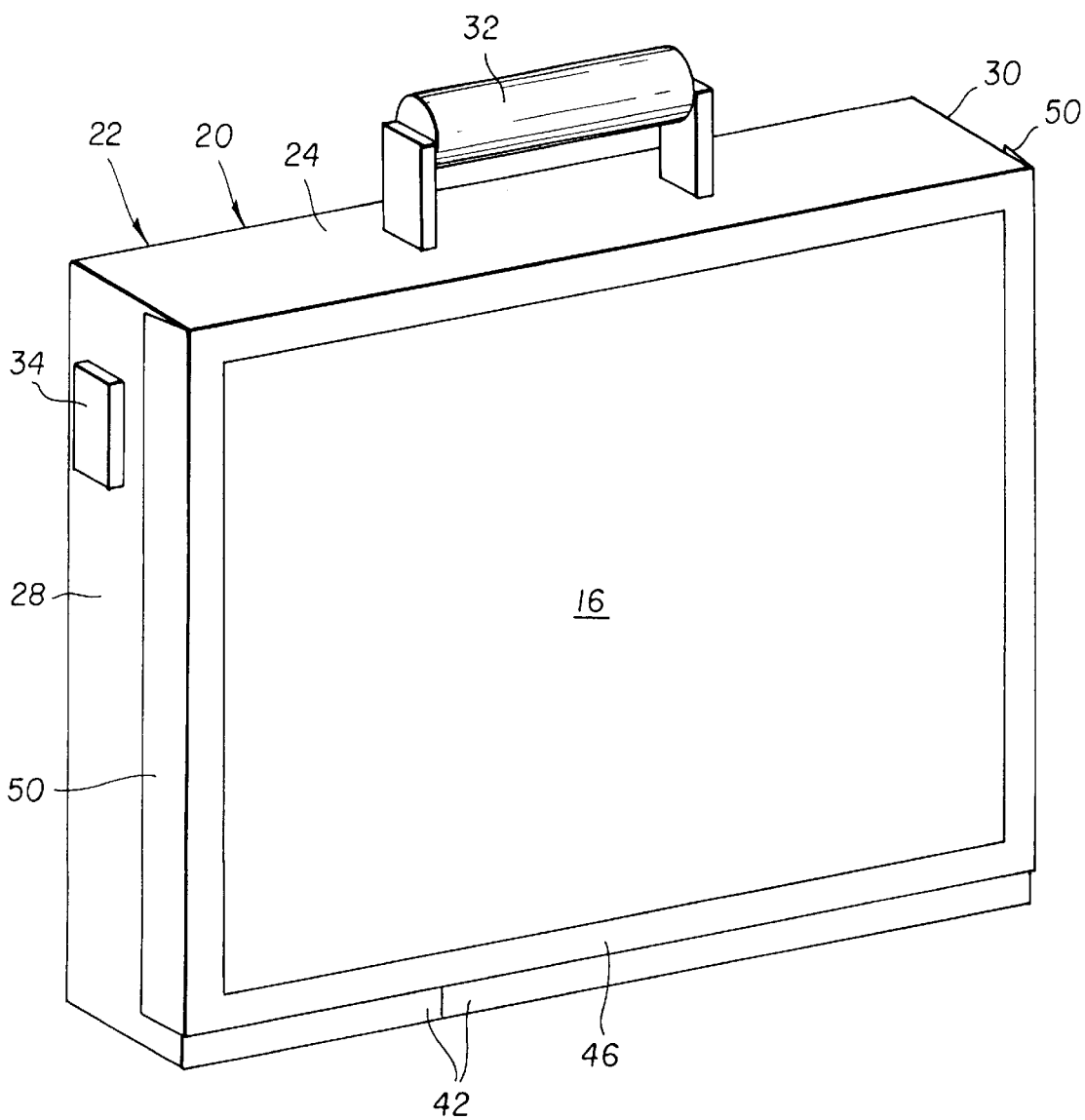

With reference to FIGS. 1–3, one preferred embodiment of the privacy and light shade accessory of this invention is shown as an integral part of a computer case 20 housing the laptop computer 10. The computer case 20 serves to indirectly mount the privacy and light shade accessory to the computer, and comprises a base member 22 for supporting the remainder of the privacy and light shade accessory. The base member 22 comprises a rectangular base panel 23 having four upright panels 24, 26, 28, 30 at the periphery thereof joined at one of the edges thereof to the base panel 23 to form a box in which the computer resides when the case is closed. One panel 24 of the two longer upright panels 24, 26 has a handle 32 attached to it for carrying the case, and is herein designated as the upper upright panel 24, as it is on top when the case is carried or opened for use. Each of the shorter upright panels 28, 30 is called a side panel, and has an attachment point 34 for a removable shoulder harness (not shown). A front panel 36 of the computer case 20 is hingeably attached preferably by a living hinge 38 to the opposite edge from the joined edge of the lower upright panel 26. The inner surface 40 or portions thereof of the front panel 36 is composed of a hook or loop-type fastener material 37 adapted to mate with a hook or loop-type fastener material which the user must attach to the bottom surface of the computer for releasably mounting the computer 10 onto the front panel 36.

The privacy and light shade accessory further comprises a pair of side shade panels 42 hingeably connected by living hinges 44 to the opposite edges from the joined edges of their corresponding upright side panels 28, 30. The side shade panels 42 are pivotally movable between a folded inoperative storage position in which the side shade panels 42 are folded together overlapping each other over the closed front panel 36, and an unfolded operative position, substantially 90 degrees from the folded inoperative position, in which the side shade panels 42 extend outwardly substantially at a 100 degree angle to the base panel 23 for shading and offering privacy to the screen 16 located therebetween.

The privacy and shading of the screen 16 is completed by a cover shade panel 46 hingeably connected by a living hinge 48 to the opposite edge from the joined edge of the upper upright panel 24. The cover shade panel 46 has a narrow side flap 50 attached to each of its side edges via a living hinge 52. The cover shade panel 46 is movable between a folded or closed position as best seen in FIG. 3, in which it is folded over the overlapped side shade panels 42 and latched to the upright side shade panels 28, 30 by hook or loop-type fastener material 49 on its side flaps 50 and the mating hook or loop-type fastener material 31 on the upright side panels, and an open privacy and shade position, substantially 120 degrees from the closed position to allow the computer operator to visually observe the screen in a sitting position without bending or hunching.

In the privacy and shade position as best seen in FIG. 2, side flaps 50 are releasably joined to edges of triangular flaps 54 on the side shade panels 42 by the hook or loop-type fastener strips 49 on the side flaps 50 mating with hook or loop-type fastener tabs or strips 57 on the upper, outer edges of the triangular flaps in their extended position. The triangular flats 54 are hinged to side shade panels 42 by living hinges 56.

Each triangular flap 54 is movable between a folded position overlapping the panel on the outside and an unfolded or extended position in which an upper edge thereof engages and supports an edge of the cover shade panel 46 after it is raised manually into its shade position. As indicated earlier, hook or loop-type fastener means 57, 49 are provided on the upper edge of the triangular flap and on the cover shade panel's matching narrow side flap 50 respectively for releasably securing them together in the unfolded position of the triangular flap. Additionally, each triangular flap 54 and side shade panel 42 are provided with mating hook or loop-type fastener tabs 55, 43 respectively for releasably holding the triangular flap 54 in its folded position. The triangular flap is hinged near but not at the top edge of the side shade panel 42 to define an edge strip 63 therebetween—and therefore must be shaped as a parallelogram rather than a true triangle—so that when unfolded the lower edge of triangular flap 54 engages and bears against the edge strip 63 of side shade panel 42 to provide rigidity to the overall side/cover shade panel structure by the flap 54 being unable to unfold further than 180 degrees from its folded position. Velcro means 65, 67 are provided on the edge strip and side shade panel respectively for releasably holding flap 54 in its unfolded position.

It is also desirable to allow the side shade panels 42 to be positioned laterally outwardly relative to the sides of the keyboard 12 (e.g. slightly greater than 90 degrees from their closed, overlapping positions) to allow the operator to operate the keyboard without any undue interference between the operator's hands and the side shade panels. This is achieved by providing each side shade panel 42 with a leaf 58 hinged by a living hinge 60 to its bottom edge and which is movable between a folded position overlapping the side shade panel 42 on the inside and held thereon by mating hook or loop-type fastener tabs 59, 61 on the leaf and side shade panel respectively, and an unfolded position substantially perpendicular thereto in which the free end 62 of the leaf is partially interposed between the front panel 36 and the bottom of the laptop computer 10 supported thereby, for holding the side shade panel 42 in its lateral outward position. Alternatively, the free end 62 of the leaf may be partially interposed between the front panel 36 and a table top surface, not shown, supporting the front panel.

The side shade panels 42 are further provided with one or more pockets 64 or pouches for holding floppy disks, CD's, or similar small, thin accessories. Similarly, the cover shade panel 46 is provided on its outside with one or more flexible pockets 64, with closing cover flaps, for holding paper, the case's removable shoulder strap, and/or other light accessories.

The base member 22 may further be provided with hook or loop-type fastener material on its outer rear surface adapted to mate with hook or loop-type fastener material on a separate accessory case or briefcase, not shown, for releasably holding the accessory case or briefcase onto the computer case 20. In the case where the accessory case is so attached, the user would carry the combination with the laptop case's handle or shoulder harness. However, when a briefcase which is larger than the laptop case is so attached, the user will wish to carry the combination via the briefcase's handle or shoulder harness. In this case, the laptop case could fall off or be easily pulled off by a casual thief if attached to the briefcase only by a hook or loop-type fastener. Therefore, the briefcase can further be provided with short straps that mate to the laptop case's removable shoulder strap attachment points 34 to further secure the cases together.

Let us assume that the laptop computer 10 is in its stored position as seen in FIG. 3. To operate the computer in private and in the shade, the operator must release the flaps 50 of the computer case's cover shade panel 46 by breaking the hook or loop-type fastener connection between hook or loop-type fastener means 49, 31 and pivot or raise the cover shade panel substantially 180 degrees over the top of the case to reveal the front thereof. The side shade panels 42 are then unfolded substantially 110 degrees each, from their position over the front panel 36, and the front panel 36 and computer 10 mounted thereon are lowered substantially 90 degrees onto a support surface such as a table. The screen member 14 of the computer is unlatched from the keyboard member 12 and rotated substantially 110 degrees to a normal viewing position, which extends slightly into the vertical box formed by he base panel 23 and upright panels 24, 26, 28 and 30. The hingeable leaves 58 of side shade panels 42 are pivoted substantially through angles of 90 degrees into their unfolded positions and partially stuffed between the body of the computer 10 and the front panel 36 to secure each side shade panel 42 in a position near but not against the side of the computer for ease of typing. The triangular flaps 54 on the side shade panels 42 are moved through angles of substantially 180 degrees to their unfolded position and held there by mating hook or loop-type fastener tabs 65, 67 on the flaps 54 and edge strips 63 of panels 42 respectively. Then the cover shade panel 46 is pivoted forward into its final unfolded position over the side shade panel triangular flaps 54 and secured thereto by mating hook or loop-type fastener material 49, 57 on the cover shade panel's side flaps 50 and the upper edges of the side shade panel triangular flaps 54 respectively to form a hood or tent over the screen, as best seen in FIG. 2. The process is reversed to disassemble the privacy and shade accessory and position the computer in its stored position. Due to many features of he above design, this whole assembly, use, and disassembly process can be accomplished within very limited confines such as those of the most constricted of coach class airplane seats.

Figure 4:
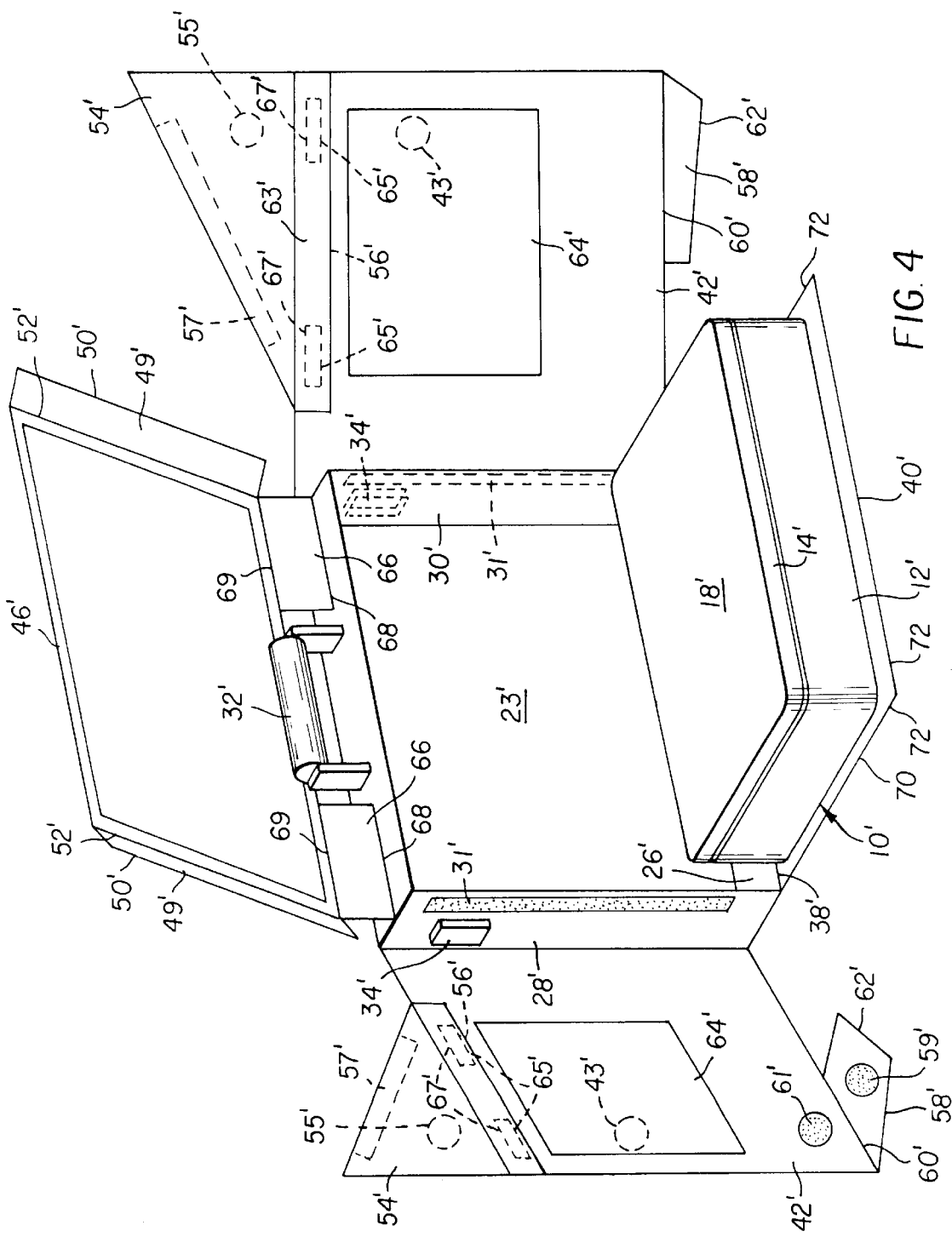
FIGS. 4 and 4A are perspective vector and 3D solid renderings or views respectively of the same drawing of one embodiment of a privacy an light shade accessory of this invention in a partially open position.
Figure 4A:
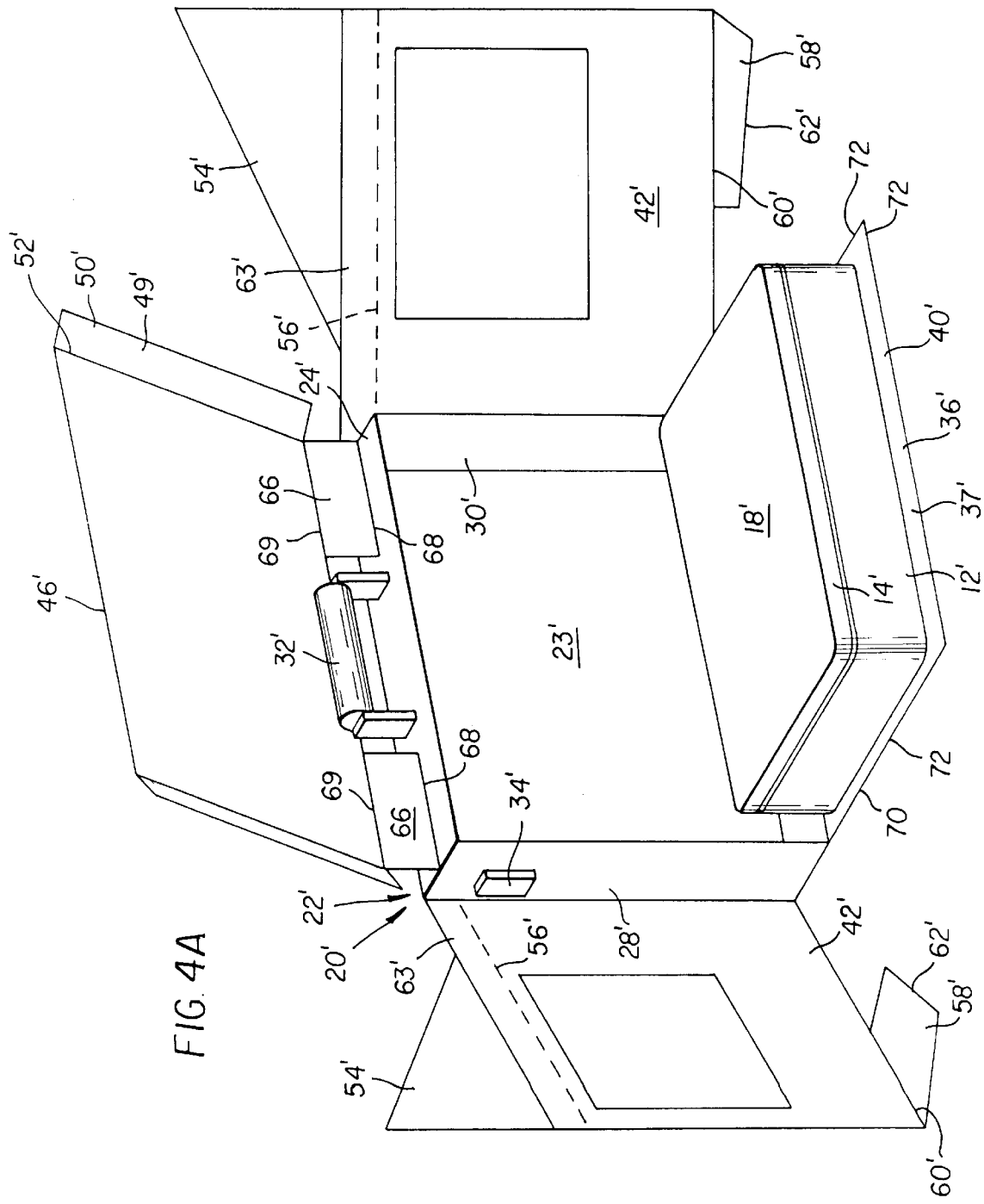
Figure 5:
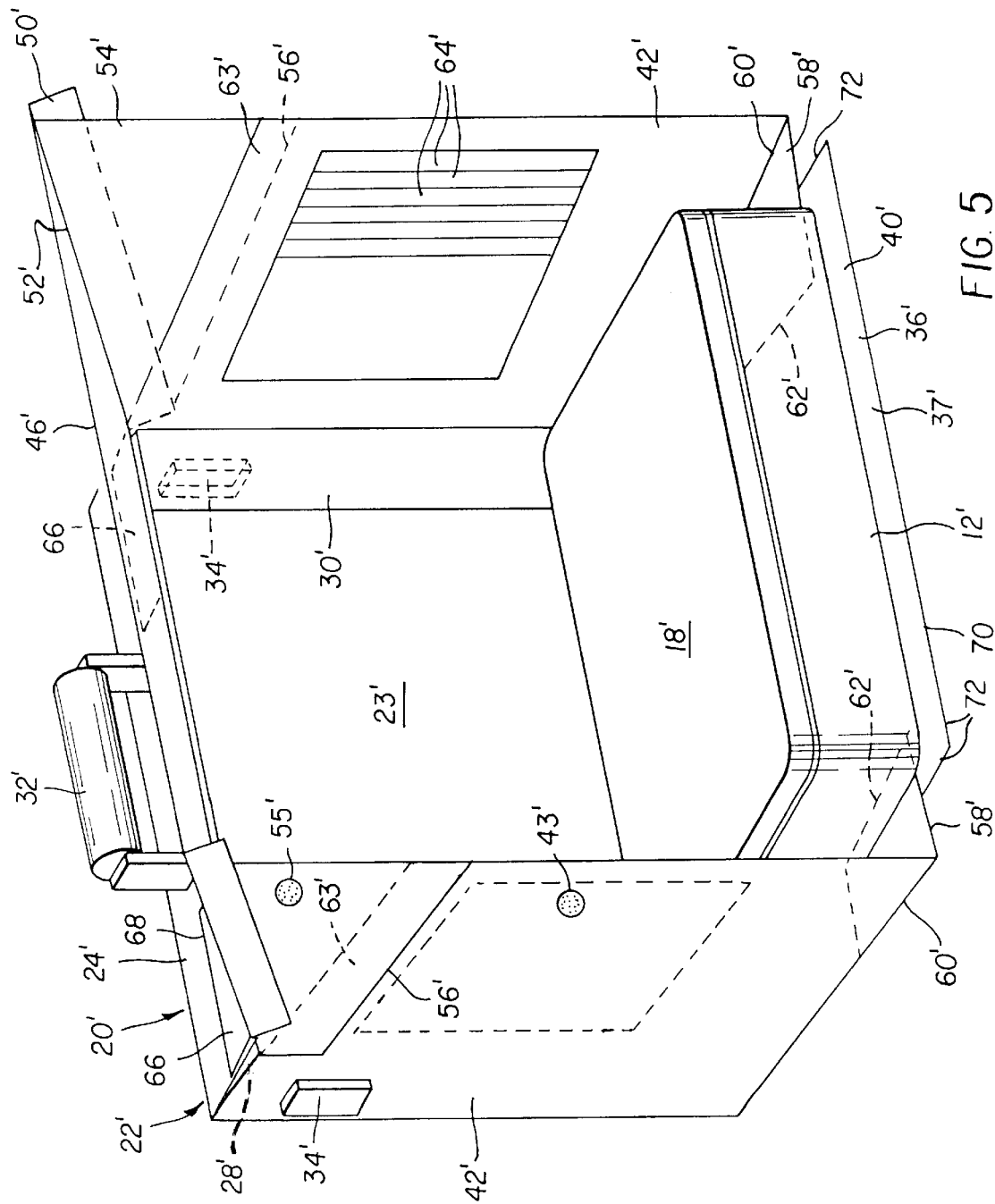
FIGS. 5 and 5A are perspective views similar to FIGS. 4 and 4A showing the privacy and light shade accessory in its operative position to provide the computer screen with privacy and shade.
Figure 5A:
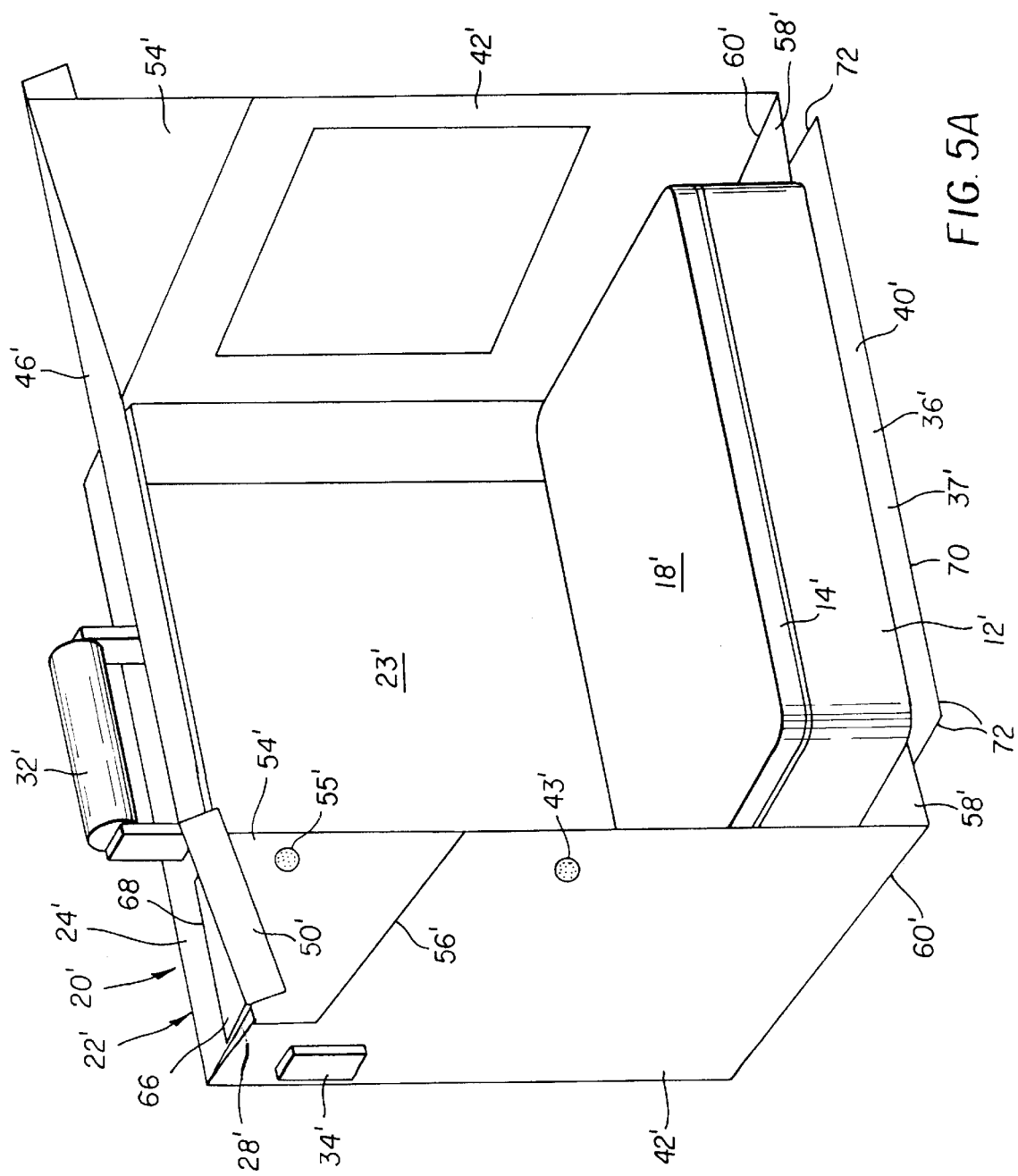
Figure 6:
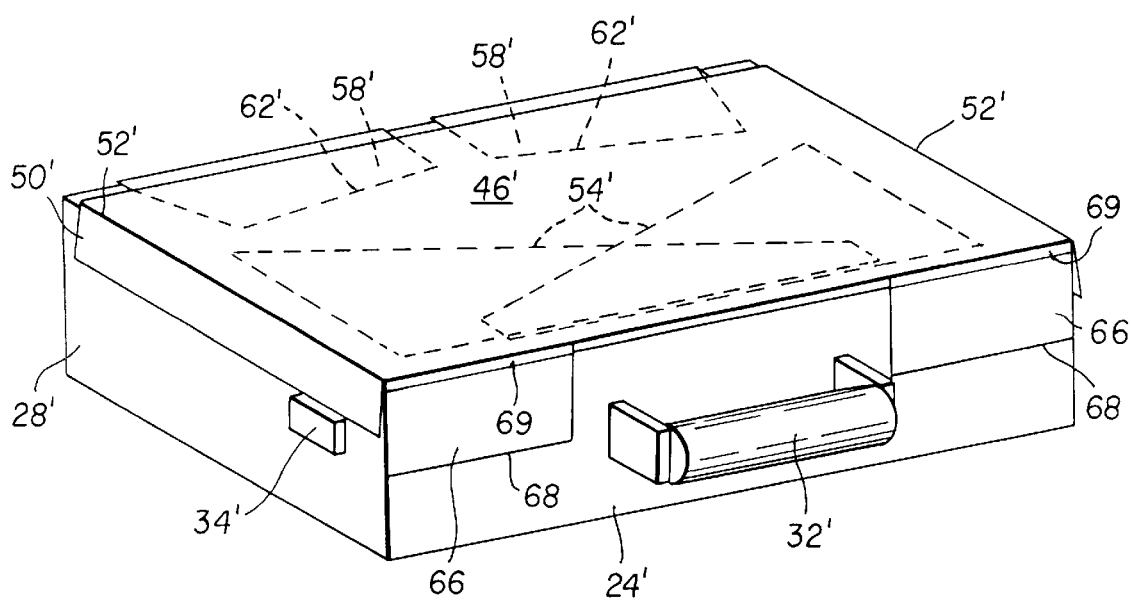
FIGS. 6 and 6A are perspective views similar to FIGS. 4 and 4A showing the privacy and light shade accessory in its closed storage position.
Figure 6A:
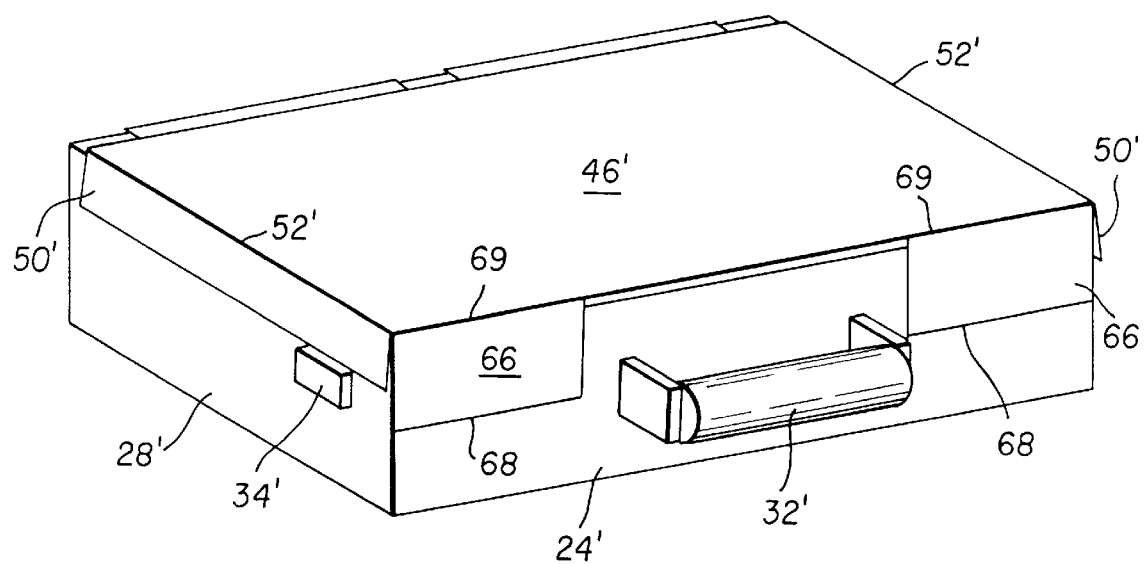

Another preferred embodiment of the invention is disclosed in FIGS. 4–6. In this embodiment, parts similar to parts illustrated in FIGS. 1–3 are denoted by the same numerals primed. The primary difference between this embodiment and the previously described embodiment is that the side and cover shade panels 42, 46 respectively are folded into their storage position over the rear base panel member 23 instead of over the front panel 36. The side shade panels are wider than those of the previously described embodiment to accommodate the added width of the side shade panels 28', 30' and are attached to the base member 22' at the same edge at which the upright panels 24', 26' 28' 30' are also attached or joined to the base panel 23'. In the folded position of these side shade panels 42', they overlap the outer surface of the base panel 23'. Their operative position is substantially 260 degrees from this position. Each side shade panel 42' has a substantially triangular flap 54' attached via a living hinge 56' near the shade panel's upper edge, a hingeable leaf 58' attached via a living hinge 60' to the side shade panel's lower edge, and optional pockets 64' for holding floppy disks, CD's and the like, exactly as with the previously described embodiment.

A small panel 66 is attached by a living hinge 68 to the upper panel 24' on either side of the carrying handle 32'. Each of these two small panels 66 is just over half the width of the upper panel 24' and is attached to it via living hinge 68 along the center line of the upper panel's narrow dimension. An edge of the cover shade panel 46' is attached to the opposite edge of each of these small panels 66 by a living hinge 69 so that the cover shade panel can be folded to overlap and cover the side shade panels 42' in their folded position. As before, the cover panel 46' has narrow side flaps 50' covered with hook or loop-type fastener strips 49' and attached to its side edges by living hinges 52'. The cover shade panel 46' can be hinged substantially 240 degrees between its closed position, described above, and its shade position where its side flaps 50' releasably attach via hook or loop-type fastener to the side shade panels' unfolded triangular flaps 54'.

As in the previous embodiment, the keyboard member 12 of the computer is attached by hook or loop-type fastener material 37' on the front panel 36', mating with hook or loop-type fastener material which the user must attach to he bottom of the computer keyboard member. The front panel 36' is attached by a living hinge 38' to the lower upright panel 26' exactly as in the previously described embodiment. However, the front panel in this embodiment is further releasably attached to the base member 22' via a zipper 70 that runs along the remaining three free edges 72 of the front panel 36' and the corresponding matching opposite edges of the other three upright panel members 26', 28' 30'.

Assembly and disassembly of this embodiment of the privacy and light shade accessory is as follows. Let us assume that the laptop computer 10 is in its stored position as seen in FIG. 6. To operate the computer in private and in the shade, the operator must unzip the zipper 70 on front panel 36' and lower the computer mounted thereon substantially 90 degrees onto a support surface such as a table. The screen member 14' of the computer is unlatched from the keyboard member 12' and rotated substantially 110 degrees to a normal viewing position, which extends slightly into the vertical box formed by base panel 23' and upright panels 24', 26', 28' and 30'. The side flaps 50' of the computer case's cover shade panel 46' are released by breaking the hook or loop-type fastener material 49', 31', and the cover shade panel is pivoted substantially 180 degrees over the top of the case. The side shade panels 421 are then unfolded substantially 170 degrees each, from their positions behind the base panel 23'. The hingeable leaves 58' of side shade panels 43' are pivoted substantially through angles of 90 degrees into their unfolded positions and partially stuffed between the bottom of the computer and the front panel 361 to secure each side shade panel 42' in a position near but not against he side of the computer for ease of typing. The side shade panel's triangular flaps 54' are moved through angles of substantially 180 degrees to their unfolded position and held there by hook or loop-type fastener tabs 61', 65'. Then the cover shade panel 46' is pivoted the rest of the way into its unfolded position over the side shade panel's triangular flaps 54' and secured thereto by mating hook or loop-type fastener material 49', 57' on the cover shade panel's flaps 50' and the edges of the side shade panel's triangular flaps 54' respectively to form a hood or tent over the screen as seen in FIG. 5. The process is reversed to disassemble the privacy and shade accessory and position the computer in its stored position.

Figure 7:
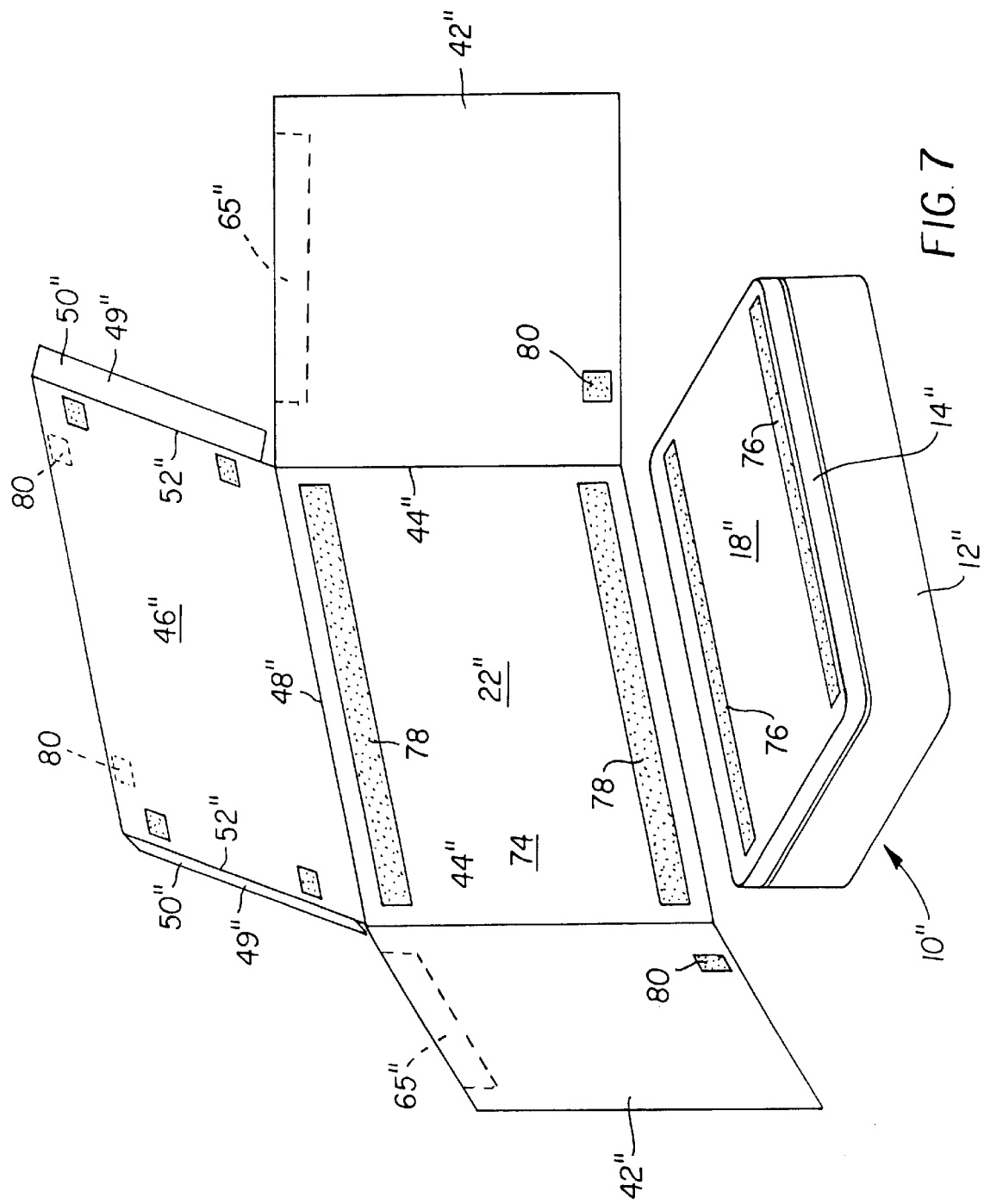
Figure 8:
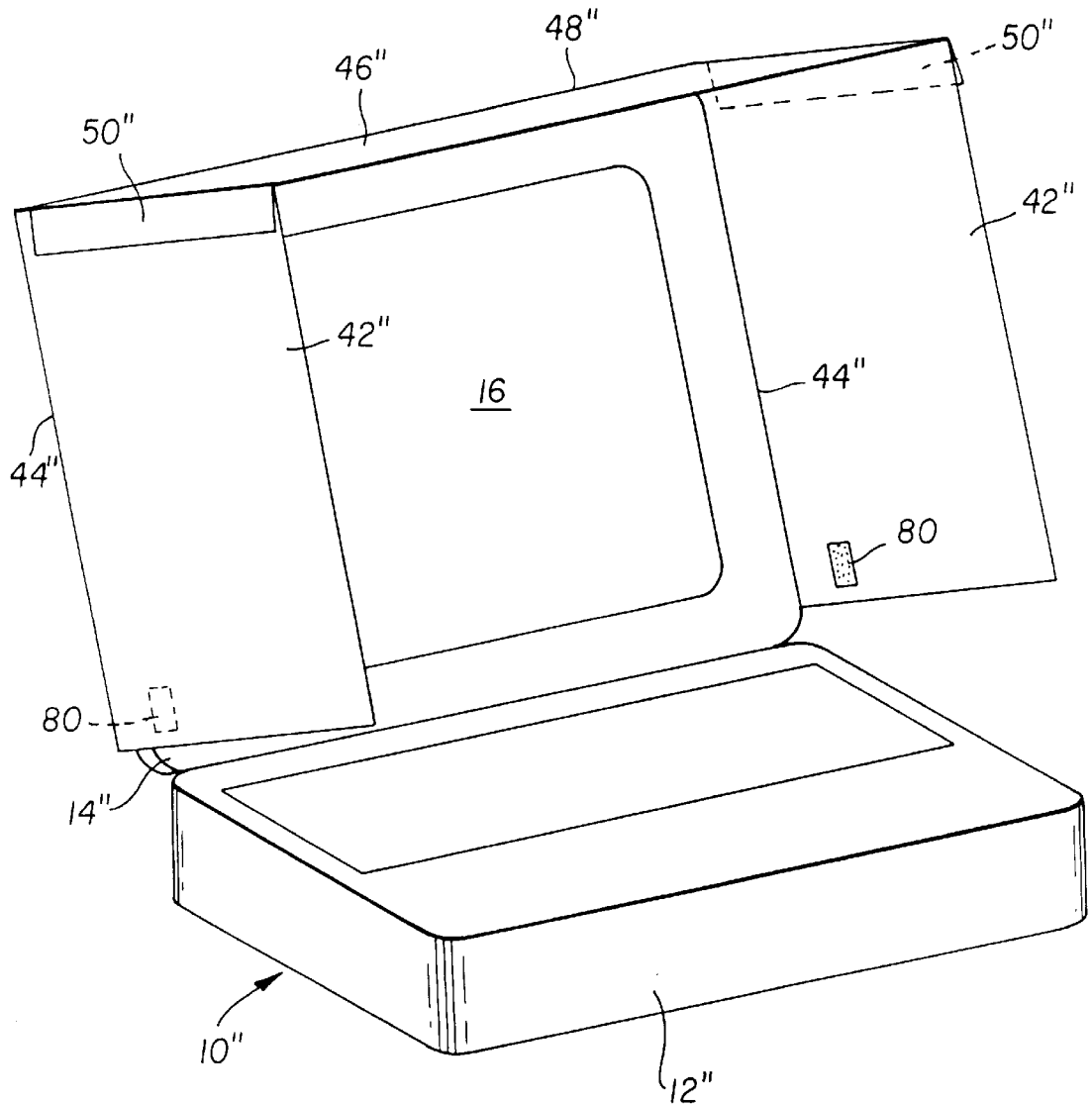
FIGS. 8 and 8A are perspective views similar to FIGS. 7 and 7A showing the privacy and light shade accessory in its operative position to provide the computer screen with privacy and shade.
Figure 8A:
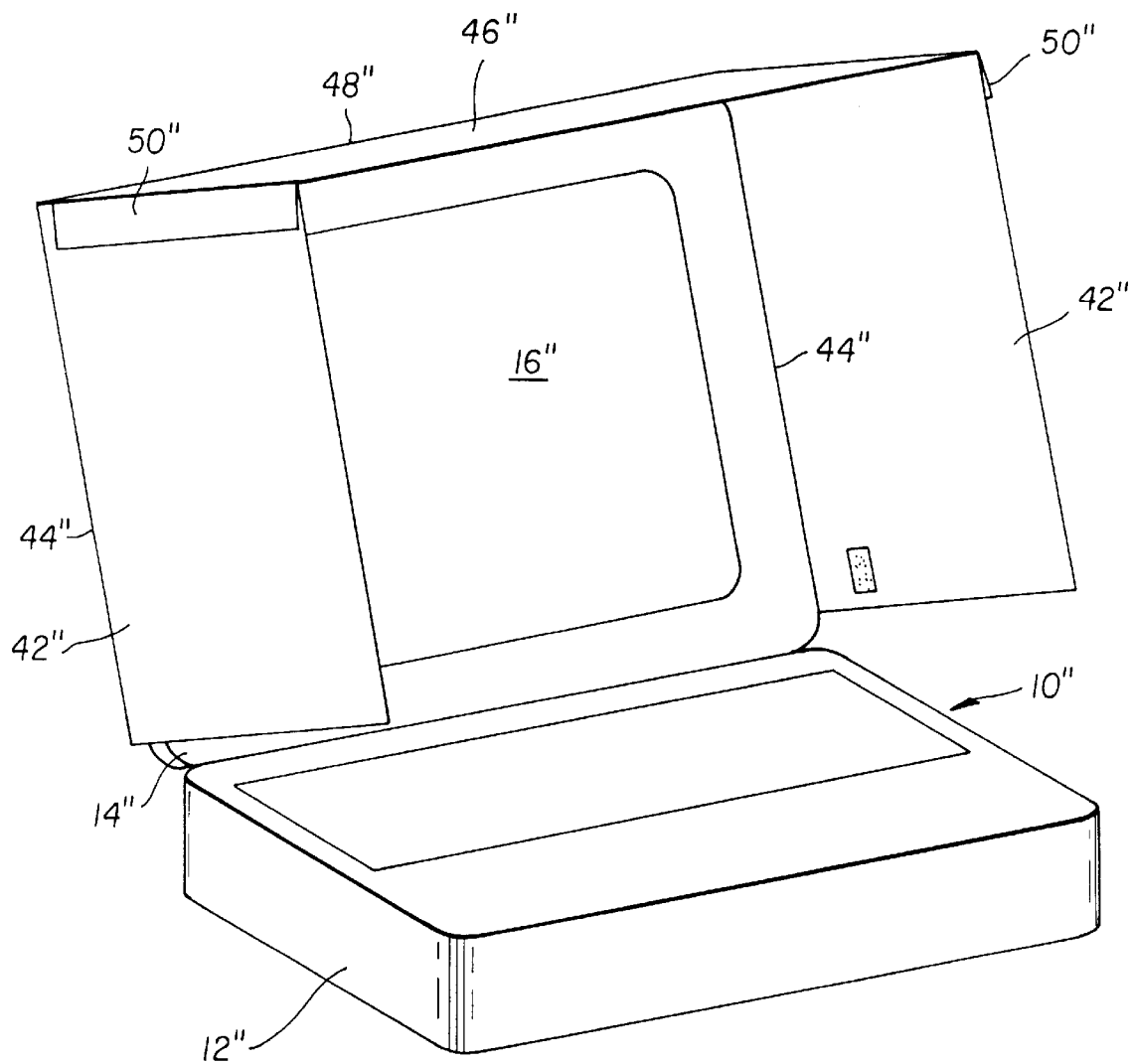
Figure 9:
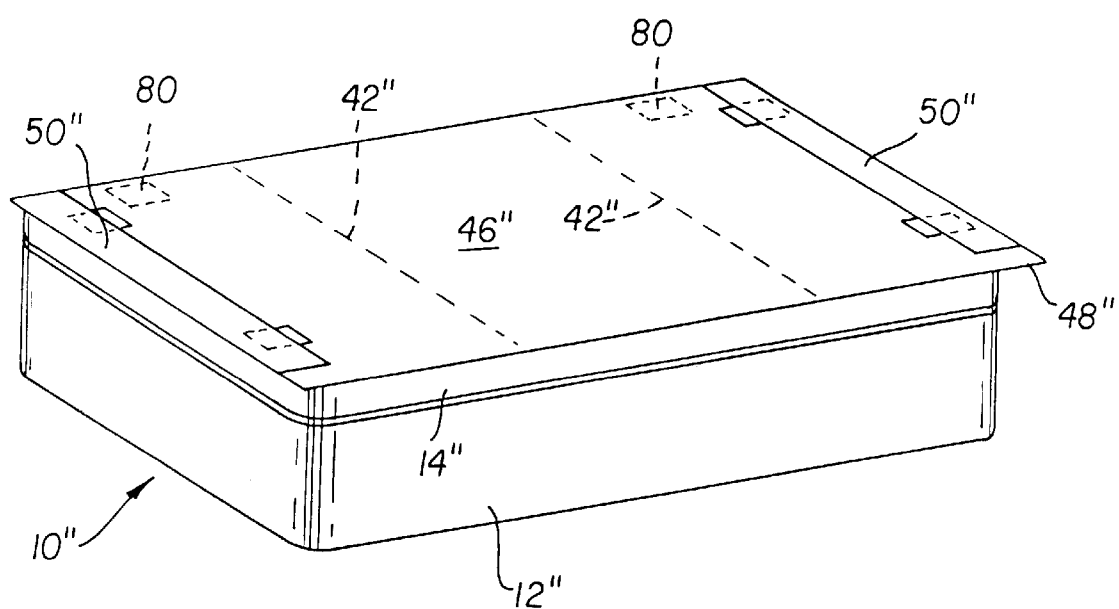
FIGS. 9 and 9A are perspective views similar to FIGS. 7 and 7A showing the privacy and light shade accessory in its closed storage position.
Figure 9A:
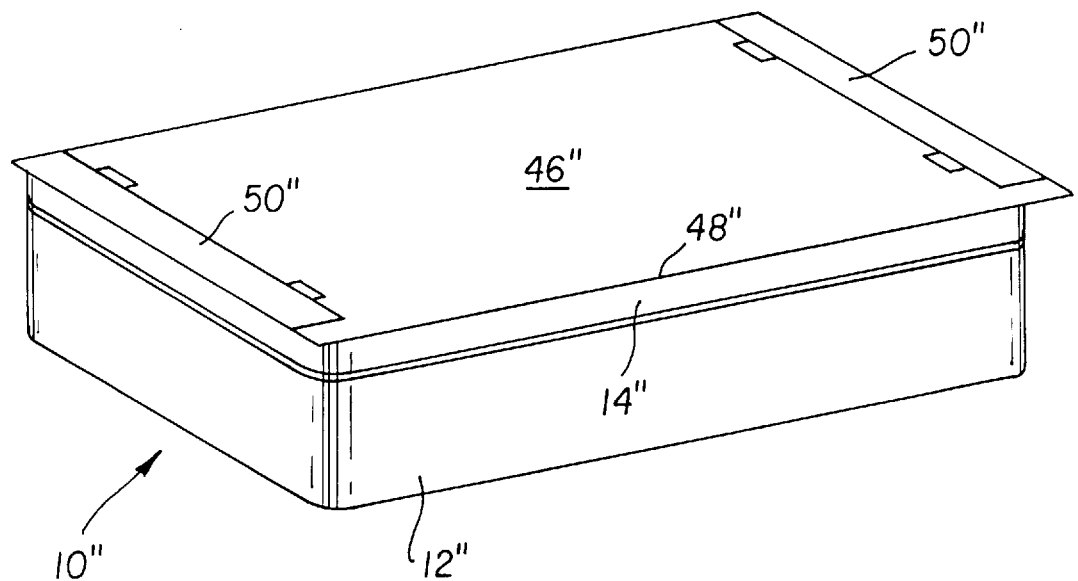

With reference to FIGS. 7–9, a more simplified preferred embodiment of the invention is disclosed. In this embodiment, the base member and other parts similar to those disclosed in the other embodiments are denoted by the same numerals double primed. In this embodiment, the base member 22" comprises a single substantially rectangular panel 23" which alone supports the privacy and light shade accessory. The outer periphery of the panel 23" is substantially in register with the outer periphery of the screen member 14". The base member 22" is releasably secured to the screen member 14" by mating hook or loop-type fastener material 76", 78" on the outer surface 18" of the screen member and front inner surface 74 of the base member respectively. The shade panels 42" fold flat and overlap over the rear outer surface of the base member 22", and the cover panel 46" folds flat over the side shade panels 42" and is releasably secured thereto by mating hook or loop-type fastener tabs 80 on the cover panel 46" and side shade panels 42". In this closed position, as seen in FIG. 9, the privacy and shade accessory adds very little to the size or weight of the laptop computer.

With this embodiment, to operate the computer in private and in the shade, the screen member 14" of the computer is unlatched from the keyboard member 12" and rotated substantially 110 degrees to a normal viewing position. Then the cover panel 46" is released from the rear of the side shade panels 42" by breaking the hook or loop-type fastener tabs 80 therebetween, and pivoted upwardly substantially 270 degrees. The side shade panels 42" are unfolded and moved substantially 270 degrees into their unfolded positions. The cover and shade panels are joined together by flaps 50" on the cover panel 46" having hook or loop-type fastener material 49" mating with hook or loop-type fastener material 65" on the side shade panels 42" to form a hood for the screen member, as best seen in FIG. 8. Disassembly of the privacy and shade accessory is accomplished by reversing the above procedural steps.

All of the panels of the preferred embodiments of the privacy and light shade accessories are preferably constructed from flat plastic or similar construction material. The panels of the first and second preferred embodiments are further covered by a flexible material such as ripstop nylon, for example, which also forms living hinges between panel members. In the third preferred embodiment the panels are not covered and the hinges may either be living hinges made from pinched spots in the panel material itself or piano hinges bonded to the panels. It should be understood that wherever hinges are designated, any type of suitable hinge can be used. Also, wherever hook or loop-type fastener material is used to releasably join two members, it should be understood that the hook or loop-type fastener material may be in any form such as strip or tab form, for example, and that any other suitable form of releasable fastening means such as snaps, for example, may be used.

The invention has been described in detail with particular reference to preferred embodiments thereof, but it will be understood that variations and modifications can be effected within the spirit and scope of the invention.

What is claimed is:

1. A privacy and light shade accessory for a screen member of a laptop computer which is pivotally movable between inoperative and operative positions relative to a keyboard of a laptop computer, the privacy and light shade accessory comprising:

a laptop computer case for housing the laptop computer and movable between open and closed position, said computer case having a front panel with inner and outer surfaces for supporting the computer on said inner surface in said open position of said computer case and a base member for supporting the privacy and light shade accessory, said base member having peripheral upright panels forming a box for receiving the screen member in its operative position; and a plurality of separate independent shade panels comprising a pair of side shade panels and a cover shade panel wherein said base member is directly interposed between said pair of said side shade panels and adjoins said cover shade panel, each of said side and cover shade panels further being pivotally mounted on a corresponding one of said upright panels of said base member for independent pivotal movement relative to said base member between a folded storage position in which said shade panels are in overlapped relation over said outer surface of said front panel of said computer case in said closed position of said computer case, and an unfolded position relative to said base member when said computer case is in said open position in which said shade panels are adapted to be secured together to form a privacy and light shade hood for the computer screen member in its operative position.

2. A privacy and light shade accessory according to claim 1 wherein said pair of side shade panels have upper free ends and said cover shade panel has opposite free ends, and wherein said accessory further comprises means for selectively releasably securing said opposite free ends of said cover shade panel to said upper free ends of said shade panels to form said hood in said unfolded position of said shade panels, and to complementary opposite upright panels for releasably holding said shade panels in said folded storage position and said computer case in said closed position.

3. A privacy and light shade accessory according to claim 2 wherein said means for selectively releasably securing said opposite free ends of said cover shade panel to said upper free ends of said side shade panels and to said opposite upright panels comprises a plurality of complementary pairs of fasteners wherein one member of each complementary pair is attached to said opposite free ends of said cover shade panel and the second member of said complementary pair is attached to said upper free ends of said side shade panels and to said opposite upright panels.

4. A privacy and light shade accessory for a screen member of a laptop computer which is pivotally movable between inoperative and operative positions relative to a keyboard of the laptop computer, the privacy and light shade accessory comprising:

a laptop computer case movable between open and closed positions and comprising a box member for housing the laptop computer and supporting the privacy and light shade accessory, said computer case having a front panel for supporting the computer in said open position of said computer case;

said box member having a base panel and upright panels extending from said base panel at the periphery thereof;

said front panel is hingeably secured to an edge of one of said upright panels for movement between a closed position substantially parallel to said base panel when said case is closed and an open horizontal position substantially perpendicular to said base panel and coplanar to said one upright panel when said case is opened and in which it supports the laptop computer;

a cover shade panel hingeably secured to an edge of another one of said upright panels opposite said one upright panel for movement between a folded position substantially parallel to said base panel when said case is closed and an unfolded position substantially perpendicular to said base panel when said case is opened;

a pair of side shade panels between which said box member is interposed, said side shade panels being hingeably secured to edges of the remaining two upright panels for movement between a folded position substantially parallel to said base panel when said case is closed and an unfolded position substantially perpendicular to said base panel when said case is opened wherein in said open position of said computer case, said cover and side shade panels extend from said base member in their unfolded position and are adapted to be secured together to form a hood for the screen of a laptop computer, and in said closed position of said computer case, said front panel and side shade and cover shade panels are arranged into said folded position in overlapping relation; and means for selectively releasably securing said cover shade panel to said side shade panels in their unfolded position to form said hood and to said box member in said closed position of said computer case to releasably hold said cover and side shade panels in said closed position and said computer case in said closed position.

5. A privacy and light shade accessory according to claim 4 wherein each side shade panel has a hingeable flap spaced from one edge thereof to define an edge strip therebetween, and each flap further being movable between a folded position in which said flap overlaps said side shade panel, and an unfolded position, in which said flaps are adapted to engage and support said cover shade panel in a plane substantially perpendicular to said screen member in its operative position.

6. A privacy and light shade accessory according to claim 5 wherein said hingeable flap is substantially triangular in shape, and means are provided for releasably coupling said edge strip of said side shade panels to said corresponding hingeable flap for holding said hingeable flap in its unfolded position.

7. A privacy and light shade accessory according to claim 6 wherein said releasably coupling means comprises a plurality of complementary pairs of hook and loop fasteners, one member of each complementary pair being attached on said edge strips of each of said side shade panels and said second member of said complementary pair being attached to said corresponding hingeable flaps.

8. A privacy and light shade accessory according to claim 5 wherein each side shade panel has a hingeable leaf on an edge thereof opposite said one edge, said leaf being movable between a folded position overlapping said side shade panel and an unfolded position substantially perpendicular thereto in which said leaf is adapted to be interposed between said support panel and computer supported thereby for laterally varying the position of said shade panel relative to its substantially perpendicular unfolded position.

9. A privacy and light shade accessory according to claim 8 wherein mating pairs of hook and loop fasteners are interposed between each of said shade panels and a corresponding one of said leaves for releasably coupling each of said shade panels to a corresponding one of said leaves for holding said leaves in said folded position.

10. A privacy and shade accessory according to claim 9 wherein at least one of said cover and side shade panels is provided with a pocket for storing computer accessories.

11. A privacy and light shade accessory according to claims 4 wherein said privacy and light shade accessory further comprises a zipper interposed between said front panel and said upright panels for releasably holding said front panel in said closed position.

12. A privacy and light shade accessory according to claim 11 wherein said front panel has three free peripheral sides, and wherein said zipper is interposed between said three free sides and complementary upright panels.

13. A privacy and light shade accessory for a screen member of a laptop computer, said screen member having an outer rear surface and being pivotally movable between inoperative and operative positions relative to a keyboard of the laptop computer, the privacy and light shade accessory comprising:

mounting means comprising a base member adapted to mount onto and to overlie at least a portion of said outer rear surface of said screen member for releasably mounting the privacy and light shade accessory on said laptop computer; and a plurality of separate independent shade panels comprising a pair of side shade panels and a cover shade panel wherein said base member is directly interposed between said pair of side shade panels and adjoins said cover shade panel, each of said side and cover shade panels having first, second and third free ends and a hinged end hinged directly to said base member wherein said shade panels are adapted to be independently movable relative to said base member about said hinged ends between a folded storage position in which said shade panels are in overlapped relation, and an unfolded operative position in which complementary ones of said first, second and third free ends of said shade panels are positioned adjacent to one another to form when secured together a privacy and light shade hood for the computer screen member.

14. A privacy and light shade accessory according to claim 13 wherein said releasably mounting means comprise a plurality of upright panels secured to said base member at right angles thereto to form a box for receiving the laptop computer.

15. A privacy and light shade accessory according to claim 14 wherein said shade panels are hinged to said upright panels.

16. A privacy and light shade accessory according to claim 13, and wherein each of said side shade panels has a hingeable flap adjacent one edge thereof movable between folded and unfolded positions, and adapted in their unfolded positions to engage and support said cover shade panel in a plane substantially perpendicular to said screen member in its operative position.

17. A privacy and light shade accessory according to claim 13, and further comprising first fasteners on said complementary ones of said free ends of said shade panels for releasably securing said free ends together to form said hood in said unfolded operative position.

18. A privacy and light shade accessory according to claim 17 wherein said first fasteners comprise complementary pairs of hook and loop fasteners.

19. A privacy and light shade accessory according to claim 17 wherein said means for releasably mounting the privacy and light shade accessory on said laptop computer comprises complementary pairs of second fasteners, one member of each pair being attached to said outer rear surface of said screen member, the second member of said pair being attached to said base member.

20. A privacy and light shade accessory according to claim 13 wherein in said folded storage position said shade panels overlie said outer rear surface of said screen member, and wherein each of said shade panels is pivotally movable through an angle of substantially 270° from said folded storage position to said unfolded operative position.

* * * * *